W. L. POTTER.
Corn Sheller.
No. 23,488.
Patented April 5, 1859.
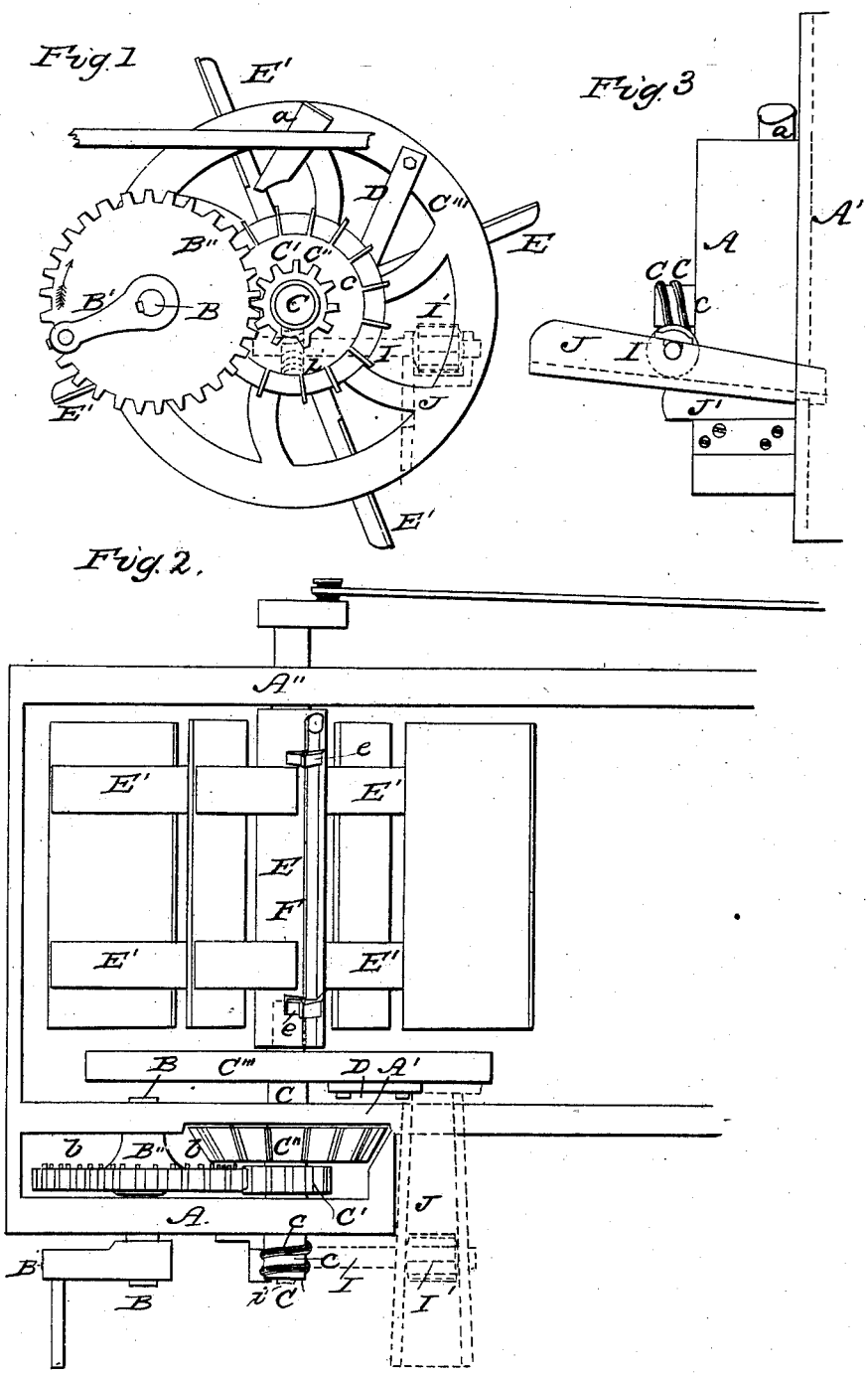

UNITED STATES PATENT OFFICE.

WILLIAM L. POTTER, OF CLIFTON PARK, NEW YORK.

IMPROVEMENT IN THE ARRANGEMENT OF MACHINERY FOR OPERATING CORN-SHELLERS SEPARATELY OR JOINTLY WITH A FAN OR CUTTER.

Specification forming part of Letters Patent No. 23,488, dated April 5, 1859.

*To all whom it may concern:*

Be it known that I, WILLIAM L. POTTER, of Clifton Park, in the county of Saratoga and State of New York, have invented a new and Improved Arrangement of Machinery for Shelling Corn, Cleaning Grain, and Cutting Hay or Straw; and I do hereby declare that the following is a full, clear, and exact description of the construction and operation of the same, reference being had to the accompanying drawings, in which—

Figure 1 is a side elevation of the working parts. Fig. 2 is a plan view of the same, as also of the frame in which they are mounted; and Fig. 3 is a portion of an end elevation.

Similar letters of reference refer to like parts in all the drawings.

To enable others skilled in the art to make and use my invention, I will proceed to describe its construction and operation by the aid of the drawings and of the letters of reference marked thereon.

A A' A'' is a suitable frame in which the working parts are sustained. I first select or construct the gearing of a corn-sheller B'' b C' C''. Any of the combinations of gearing successfully used for the purpose of shelling corn will, however, serve in my invention in lieu of these particular parts. I mount it in the frame A A'. The machine is now simply a corn-sheller inserted in a portion of a large frame, differing from those generally used for shelling corn. With this corn-sheller I now combine in the manner represented a fan E E' and sieves (worked in the ordinary manner by a crank on the end of the fan-shaft) for the purpose of cleaning grain. I also attach a knife or knives D to the fly-wheel C''' or to some other convenient part of the corn-sheller gearing for the purpose of cutting straw or other materials in the manner represented. I also attach a suitable feed-box J and feed-gear I I', to conduct the hay or straw to the knife D for the purpose of cutting.

When the form of corn-sheller gearing shown in the drawings is used, the shaft E, which carries the fan, is placed in line with the corn-sheller shaft C, and is made hollow in the center for the insertion of the end of the shaft C, in the manner represented, thus keeping the two shafts E and C always in line. The shaft E, which carries the fans, is made to revolve with the shaft C, by a slide F or its equivalent, which slide is moved forward and thrust between the arms of the fly-wheel C when the machine is to be used for cleaning grain.

When the machine is used for shelling or cutting, the slide F is moved back to its former position, and the fan and sieves remain stationary, so that the power may be wholly applied for the purpose of shelling or cutting.

The feed-gear is made to operate as follows: I is a detachable shaft having affixed thereon the feed-roller I'. I is actuated by the worm c, and thus compels I' to rotate slowly and to urge backward toward the body of the machine any hay or straw which may be placed in the feed-spout J. The spout J and feed-gear I I' may be readily removed or attached by means of the wedge J'.

When the knife D is arranged as above specified, the crank must be turned in the opposite direction from that when used for shelling or winnowing. It will be observed that the fan and sieves for cleaning grain, as also the knife and feed-gear for cutting straw, are in my invention entirely dependent upon the corn-sheller gearing for their movement and are operated thereby.

I do not limit myself to the precise construction, arrangement, and proportion of the parts shown in the drawings; nor do I claim, broadly, the employment of a winnower, corn-sheller, and straw-cutter complete in one frame.

Having now fully described my invention, what I claim as new therein, and desire to secure by Letters Patent, is—

The arrangement of the fan E E' and the gearing $i$ in relation to the shafts C and I, so as to connect and disconnect the same for the purpose of allowing either the fan or the cutting apparatus to be operated with the sheller or the sheller to be worked independently of either, substantially in the manner herein described.

WILLIAM L. POTTER.

Witnesses:
 THOMAS D. STETSON,
 EDWARD A. MAGEE.